July 22, 1969

B. J. COSTELLO 3,457,386

SOLDERING WITH RADIANT ENERGY

Filed Nov. 30, 1965

INVENTOR
B. J. COSTELLO
BY W. M. Kain
ATTORNEY

United States Patent Office 3,457,386
Patented July 22, 1969

3,457,386
SOLDERING WITH RADIANT ENERGY
Bernard James Costello, East Amwell Township, Hunterdon County, N.J., assignor to Western Electric Company, Incorporated, New York, N.Y., a corporation of New York
Filed Nov. 30, 1965, Ser. No. 510,590
Int. Cl. B23k 1/02
U.S. Cl. 219—85                                         1 Claim

ABSTRACT OF THE DISCLOSURE

A generally cone-like body of solder is formed on a first workpiece and the apex of the cone of solder is positioned in contact with the surface of a second workpiece. The surface of the second workpiece and the apex of the cone are heated to the melting point of the solder, for example, by the application of radiant energy, to cause a gradually enlarging area of molten solder to wet the second workpiece and bond the first workpiece thereto. As the area of molten solder gradually enlarges, foreign matter is swept ahead of the moving molten solder to substantially eliminate deleterious inclusions of foreign matter in the bond.

---

This invention relates to a method of soldering. In particular, this invention relates to a method for soldering a generally wire-like member to a workpiece, such as a printed circuit or thin-film conductor pattern, using radiant energy as a heat source.

In soldering generally wire-like members to a workpiece, it is common to first coat the end of the wire-like member with solder and then heat the solder coating while it is in contact with the workpiece. This causes the solder coating on the wire-like member to become molten, wet the workpiece, and form a bond between the wire-like member and the workpiece. Most gaseous inclusions and foreign matter, such as oxides, on the surface of the solder and/or workpiece will be present in the resulting solder bond in all probability. In the formation of solder bonds, it is very important that this be avoided because gaseous and foreign matter inclusions weaken the bond.

To be effective, a solder bond between a lead and the metallic conductor of a printed or thin-film circuit must possess high strength regardless of the direction of applied stress. The lead-film junction should contribute essentially no electrical noise to the overall circuit. Also, the solder bond must be made without damaging the film or the substrate and it must be durable indefinitely under the environmental conditions it will meet in operation. Ideally, the investment, operating, and maintenance costs of the equipment for making the bond should be low. Applicant's invention satisfies these criteria.

Accordingly, it is an object of this invention to provide a new and improved method of soldering workpieces together.

It is a further object to provide a new and improved method for soldering a generally wire-like member to a workpiece, such as a printed or thin-film circuit, using radiant energy as a source of heat.

It is still a further object to employ infrared radiation in soldering a lead to a printed circuit, the resulting bond having a minimum of gaseous and foreign matter inclusions.

With these and other objects in mind, the invention contemplates forming a generally cone-like body of solder on a first workpiece, which may be generally wire-like. The first workpiece is positioned above a second workpiece so that the apex of the cone of solder is in contact with the surface of the second workpiece. The surface of the second workpiece and the apex of the cone are heated to the melting point of the solder, causing a gradually enlarging area of molten solder to wet the second workpiece.

The terms "cone," "cone-like," and "conical," as applied to the body of solder formed on the first workpiece, are intended to include configurations having an enlarged base portion which tapers to an apex or point. Therefore, the scope of these terms is not constricted to their precise geometrical definitions.

Other objects and advantages of the present invention will be apparent from the following detailed description when considered in conjunction with the accompanying drawings, wherein.

Figure 4:
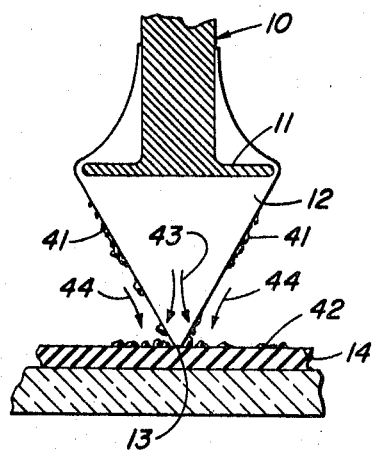
Figure 5:
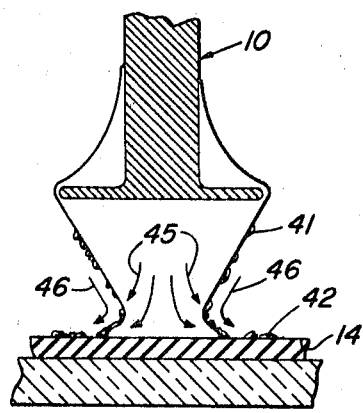
Figure 6:
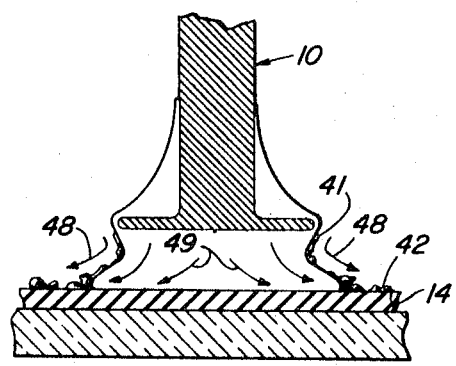
Figure 7:
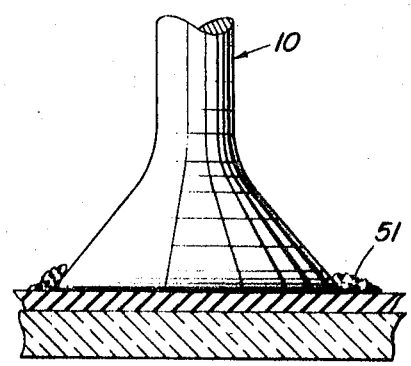
Figure 8:
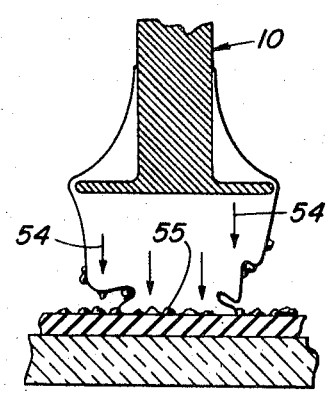
Figure 9:
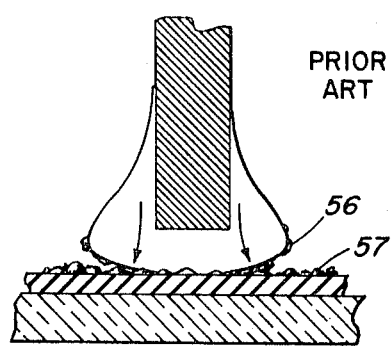

FIGURES 4, 5, and 6 illustrate the path of travel of the molten solder and of foreign matter as the cone of solder melts against the surface of the second workpiece;

FIGURE 7 shows the lead bonded to the second workpiece in accordance with this invention, foreign matter being excluded from the bond;

FIGURE 8 illustrates the path of travel of the molten solder and the foreign matter if the entire cone of solder melts at once rather than in the manner illustrated in FIGURES 4–6; and FIGURE 9 illustrates the configuration of a typical prior art solder coating on a headed lead.

Figure 1:
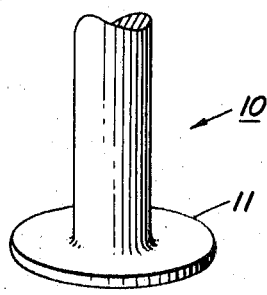
FIGURE 1 shows a headed lead which is illustrative of a first generally wire-like workpiece particularly suitable for the practice of this invention.

FIGURE 1 illustrates a lead 10 having a head 11 thereon, such a lead being particularly suitable for the practice of the soldering method hereinbelow described. This soldering method may be practiced in soldering any solder wettable, generally wire-like member whether it is headed or not. However, the head is desirable in order to provide a greater bonding area between the lead and a second workpiece to which it is soldered.

Prior to soldering lead 10 to another workpiece, it is desirable that it be cleaned. To accomplish this the lead may be washed for five minutes in a 40% acetic acid solution, rinsed for ten minutes in running deionized water, and then air dried. This procedure removes oxides which may have formed on the wire. The lead is then dipped head first into a 50–50 alcohol rosin flux solution, for example, #100 produced by Alpha Metals, Inc., to a point about ¼ inch above the head 11.

Figure 2:
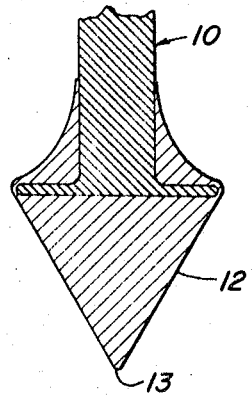
FIGURE 2 shows the headed lead with a cone-like body of solder thereon.

Next, the lead 10, being held in a vertical position, is dipped head first into a molten solder bath which may, for example, be of standard 60–40 solder at a temperature of about 210° C. The head 11 is immersed about ⅛ inch below the solder level and is held there for about two seconds and withdrawn. This results in the formation on the lead of a generally conically shaped body or spike of solder 12 terminating in an apex 13, as shown in FIGURE 2. The exact temperature of the molten solder and the length of time of the immersion is not critical. However, for best results, the temperature of the molten solder should not be much higher than the melting point of the solder and the immersion time should not be appreciably longer than is required for the solder to thoroughly wet the lead. Solidification of the solder on the lead 10 in a cone-like configuration occurs when the lead is withdrawn from the molten bath of solder into the cooler ambient atmosphere.

Prior to the soldering operation, the lead 10 with the cone of solder 12 thereon is dipped into a 30–70 alcohol-rosin flux ¼ inch beyond the head 11.

Figure 3:
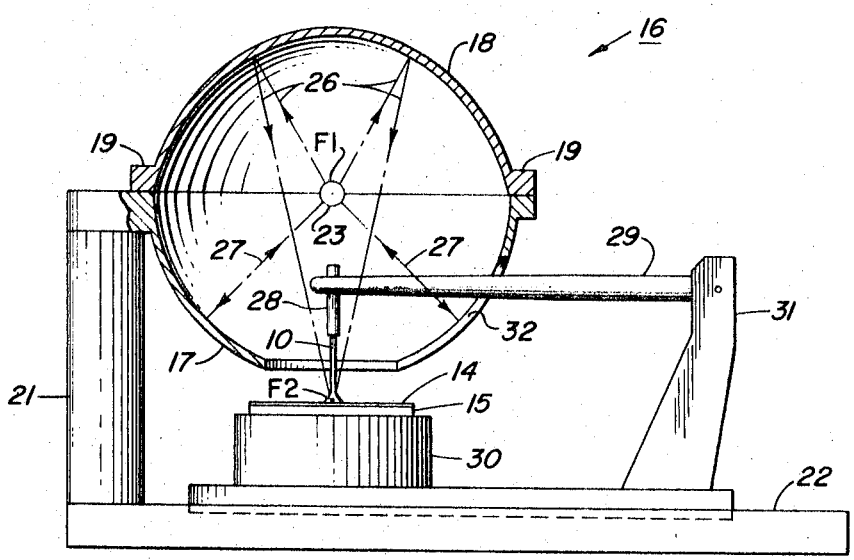
FIGURE 3 is a partially cross-sectional view of infrared heating apparatus suitable for melting the cone of solder and heating the second workpiece.

Referring to FIGURE 3, the method steps of this invention will be illustrated in bonding lead 10, having the cone of solder 12 thereon, to a desired point on the surface of a second workpiece, for example, a metallic film 14 on a substrate 15, employing infrared heating apparatus generally identified by the number 16.

Apparatus 16 comprises an elliptical-spherical reflector system including an open spherical reflector 17 and an open elliptical reflector 18. These reflectors are combined at flanges 19—19 as shown in FIGURE 3, so that the near focal point $F_1$ of the elliptical reflector 18 is coincident with the center of the spherical reflector 17 and the distant focal point $F_2$ falls outside of the spherical reflector 17. Such a reflector system is well known in the art. The apparatus 16 is supported by a stand 21 mounted on a base 22. An infrared heat lamp 23 is placed at focal point $F_1$.

The principle of operation of reflector 16 is described by the ray trace diagram incorporated in FIGURE 3. Energy leaving the source 23 and striking the elliptical reflector 18 is redirected to focal point $F_2$ to form a real image of the source 23, as shown by rays 26—26. Radiation striking the spherical reflector 17 is redirected to the source 23, since the center of the sphere is at focal point $F_1$, as shown by rays 27—27. Much of this redirected energy strikes the elliptical reflector 18 and is focused at focal point $F_2$. This technique serves to protect the operator from excessive stray radiation and also increases the heat transfer efficiency by about 30%.

The lead 10 is slipped within a hollow guide needle 28 which, in turn, is held by an arm 29. The substrate 15 is mounted on a boron-nitride pedestal 30, boron-nitride being used because of its relatively low thermal conductivity as compared with most metals. This prevents a heat sink or "chill effect" on the backside of the substrate 15.

The position of substrate 15 is adjusted on pedestal 30 so as to bring apex 13 (FIGURE 2) of the conical body of solder into contact with the point on film 14 at which soldering is desired to occur. This step may be accomplished manually or by a suitable positioning mechanism, as desired.

Next, the workpieces so arranged are positioned so that the upper surface of film 14 is in a focal plane passing through focal point $F_2$ (hereinafter referred to as "the plane of $F_2$") and apex 13 is at this focal point. This is accomplished by moving a fixture 31, of which arm 29 and pedestal 30 are integral parts, relative to stand 21 and base 22. Any well-known mechanized positioning system (not shown) may be employed to accomplish this positioning step or it may be accomplished by hand. A narrow slit 32 in the sperical reflector 17 permits such movement. With the workpieces so oriented within apparatus 16, infrared heat lamp 23 is energized, its energy being concentrated in a hot zone centered about focal point $F_2$ and in the plane of $F_2$. The hot zone may be regarded as the focused image of the actual heat source, usually the image of the hot filament within heat source 23.

It should be noted that the hot zone encompasses both apex 13 and an area on the surface of film 14 surrounding the apex. When the solder at apex 13 reaches its melting point, film 14 and substrate 15 which may, for example, constitute a printed or thin-film circuit, are appropriately preheated to accept and be wetted by the molten solder with a minimum of thermal shock. This greatly reduces the likelihood of workpiece damage, a factor of special concern with workpieces as delicate as printed and thin-film printed circuits.

Since the area of the hot zone is considerably greater than the diameter of head 11 having cone 12 thereon, the head does not prevent any significant percentage of the radiation from reaching the plane of $F_2$. A major portion of the radiation within the hot zone strikes the surface of the metallic film 14. Radiation striking the upper portion of the cone of solder is absorbed by the body of solder and, in part, conducted away by headed lead 10. As will be seen, these two factors play a significant role in the desired melting pattern of the cone of solder.

FIGURE 4 shows apex 13 of the cone of solder in contact with film 14, just prior to energizing the heat source. At this time there is a layer 41 of foreign matter, which may include oxides, gas inclusions, and dirt particles, on the surface of the cone of solder and also a layer 42 of foreign matter of film 14. Also, a layer of flux (not shown) is present on the surface of the cone of solder.

When heat source 23 is energized, apex 13 positioned at focal point $F_2$ is immediately subjected to intense radiant heat energy. Also, it may receive heat energy by conduction from the surface of film 14. Solder at apex 13 is the first portion of the cone to melt as indicated by arrows 43. The upper portions of the solder cone, which are not in the plane of $F_2$ and which are more massive and in more immediate contact with the headed lead 10, require a longer period to come to the melting temperature. It follows, and actual observations confirm, that melting commences at apex 13 and proceeds upward into the body of the cone.

Heating of apex 13 causes the flux thereon to boil and commence its fluxing action. As indicated by arrows 44, boiling flux carrying oxide impurities begins to flow toward apex 13. As soon as apex 13 melts, the headed lead and remaining portions of the solder body advance toward the surface of film 14. Hollow guide needle 28 (FIGURE 3) maintains the lead vertical while permitting the lead to slip downward.

As the heating continues, the area of contact between the cone of solder and workpiece increases, as shown in FIGURE 5. This movement, as shown by arrows 45, causes boiling flux, as well as foreign matter unaffected by the boiling flux, to flow outwardly toward the edges of the periphery of the gradually enlarging bond area, as shown by arrows 46. Foreign matter in layer 42 on the surface of film 14 is swept ahead of the moving molten solder.

Referring to FIGURE 6, the lead and cone continue to descend toward film 14 and foreign matter in layer 41 continues to be floated outward over the molten solder, as indicated by arrows 48. At this point solder flowing, as indicated by arrows 49, continues to wet an enlarging area of film 14. Foreign matter in layer 42 on the surface of film 14 is flushed ahead of the gradually enlarging periphery of this contact area. Observations indicate that this foreign matter tends to "ride the waves" of the molten solder, so to speak.

When the heating is complete, as shown in FIGURE 7, the bond should have a minimum of foreign matter therein due to the actions above-described. For the most part, the foreign matter which made up layers 41 and 42 is concentrated in a ring 51 around the periphery of the contact area, hence, will have no appreciable detrimental effect on the major portion of the bond.

The heating phase of the above-described cycle is most conveniently controlled by a timer-controlled power circuit (not shown). When the heat source is energized, the timer is turned on. When the desired soldering time has elapsed, the power circuit is turned off by the timer and the timer is automatically reset for the next cycle. Of course, this cycle may be controlled by hand, if desired.

It is important to the successful practice of this invention that the initial contact between the cone of solder and workpiece be as nearly as possible that of a point upon a surface. It is also important that the soldering heat be applied to melt the point first, causing an ever-increasing area of contact between the molten solder and the workpiece. The melting of a cone of solder under these circumstances causes the foreign matter to be flushed out towards the periphery of the contact area. As shown in FIGURE 8, if the heat is not concentrated so as to cause the point of contact to melt first, the entire solder body melts and immediately drops down toward the workpiece, as indicated by arrows 54, with no flushing action and results in entrapment of much of the foreign matter 55.

FIGURE 9 illustrates what occurs should the solder body have a shape such that point contact is not made. The foreign matter in films 56 and 57 on the surface of the solder and on the surface of the workpiece is trapped within the initial contact area with little chance for any flushing action.

Example

A drawn copper wire, .030 inch in diameter having a cold-formed head .050 inch in diameter thereon, was provided with a cone of solder in the manner described above. The cone of solder was slightly wider than .050 inch at its base in the plane of the head, tapering to an apex about .060 inch below the head of the lead. The coated lead was then soldered according to the above-discussed method steps performed in the apparatus discussed in connection with FIGURE 3 to a triple layer (gold on Nichrome on tantalum) film on a glass substrate (Corning 7059). A quartz iodine lamp rated as 250 watts at 30 volts, Model DXM, Sylvania Lighting Products, energized at 70% of its rated power (175 watts) was used as a source of infrared energy.

All reflector components were of electroformed nickel with electrodeposited gold reflective surfaces. The elliptical reflector had a 4-inch diameter at focal point $F_1$, that point being 1.4 inches from the vertex of the ellipse. The spherical reflector also had a 4-inch diameter.

Several tests were performed on the resulting joint with the following results:

(1) All bonds were inspected immediately after soldering and also 24 hours later. The solder was clean and symmetrical about the lead and appeared well wetted to both the lead and film. No damage to the film or substrate was visible at 100× magnification. This reflector system and lamp combination produced a hot zone about ⅜ inch in diameter of sufficient intensity to cause soldering between the workpieces in 3.2 seconds.

(2) Two pull tests were performed to show the adhesion strength of the solder bond. In one test the force was applied normal to the film. At about 15 pounds force the metallic film began to separate from the glass. At about 18 pounds force there was a combined glass and film failure, and at about 20 pounds the lead itself failed. The second test was performed by pulling on the lead in a direction parallel to the film, which superimposed a moment on a shear stress. The failures here for the film, combined film and glass, and lead were 9, 12, and 15 pounds, respectively. Clearly then, the *final* limiting factor is the strength of the lead, rather than that of the solder bond.

(3) An environmental test was performed by subjecting one hundred samples to thermal cycling. The test consisted of twelve temperature cycles between −40° C. and +80° C. with a minimum rate of change of 4° C. per minute and a dwell at the upper and lower limits for 20 minutes. Only one of the samples showed a fracture in the glass at 50× magnification, which seemed to be due to a stress concentration at a scratch in the glass. This general lack of glass failure indicates that there were low residual stresses in the glass after soldering.

(4) Using a resistor noise test set manufactured by Quan-Tech Laboratories, Inc. (Model #2136, Serial #116), the noise test data for 24 samples ranged from −35 to −40 decibels. "Low noise" resistors are generally within this range.

While one specific embodiment of the invention has been described in detail above, it will be obvious that various modifications may be made without departing from the spirit and scope of the invention.

What is claimed is:

1. A method of soldering a generally wire-like member having a cone-like body of solder thereon to the surface of a workpiece, comprising the steps of:

applying the apex of the cone of solder to the surface of the workpiece at the point where soldering is desired to occur, focusing infrared radiation upon the apex of the cone to first melt the solder at the apex, and advancing the wire-like member and solder body to enlarge the area of molten solder in contact with said surface.

References Cited

UNITED STATES PATENTS

| 2,021,157 | 11/1935 | Stahl | 219—93 X |
| 2,213,865 | 9/1940 | Koch et al. | 219—107 |
| 2,848,594 | 8/1958 | Aversten | 219—99 |
| 2,936,981 | 5/1960 | Aversten | 228—56 X |
| 3,242,314 | 3/1966 | Eckles | 219—347 |
| 3,267,249 | 8/1966 | Veth | 219—349 X |
| 3,283,124 | 11/1966 | Kawecki | 219—85 X |

ANTHONY BARTIS, Primary Examiner

B. A. STEIN, Assistant Examiner

U.S. Cl. X.R.

29—498; 219—349, 117; 228—56